(12) United States Patent
Arisawa et al.

(10) Patent No.: US 6,605,384 B2
(45) Date of Patent: Aug. 12, 2003

(54) ALKALINE STORAGE BATTERY THAT CAN BE USED WITH STABILITY IN A WIDE TEMPERATURE RANGE

(75) Inventors: Kenji Arisawa, Hyogo (JP); Takuya Tamagawa, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 128 days.

(21) Appl. No.: 09/794,407

(22) Filed: Feb. 28, 2001

(65) Prior Publication Data

US 2001/0033967 A1 Oct. 25, 2001

(30) Foreign Application Priority Data

Mar. 1, 2000 (JP) .......................................... 2000-056428

(51) Int. Cl.$^7$ ......................... H01M 10/26; H01M 04/32
(52) U.S. Cl. ...................... 429/206; 429/223; 429/175; 429/232
(58) Field of Search .............................. 429/223, 218.1, 429/231.1, 231.6, 206, 185, 175, 232, 94; 252/182.1

(56) References Cited

U.S. PATENT DOCUMENTS 5,972,531 A * 10/1999 Kawakami .................... 429/49
6,156,454 A * 12/2000 Bernard et al. ............. 429/223

FOREIGN PATENT DOCUMENTS

JP        11-219721     * 10/1999    .......... H01M/10/30

\* cited by examiner

*Primary Examiner*—Stephen Kalafut
*Assistant Examiner*—Raymond Alejandro
(74) *Attorney, Agent, or Firm*—Armstrong, Westerman & Hattori, LLP

(57) ABSTRACT

An alkaline storage battery having stable charging/discharging characteristics over a wide temperature range is provided. A nickel sintered base member is filled with a predetermined amount of nickel hydroxide according to a chemical impregnating method to produce a nickel positive electrode 1. At least one compound selected from a Ca compound, an Sr compound, an Sc compound, a Y compound, and a lanthanoid compound is added to the nickel positive electrode 1. An alkaline electrolytic solution for this storage battery contains at least one of KOH, NaOH, RbOH, and CsOH as an electrolyte, and has an alkaline concentration of 10 mol/l or higher.

11 Claims, 3 Drawing Sheets

ALKALINE STORAGE BATTERY THAT CAN BE USED WITH STABILITY IN A WIDE TEMPERATURE RANGE

BACKGROUND OF THE INVENTION

1. Field of the Invention

The present invention relates to an alkaline storage battery.

2. Description of Related Art

An alkaline storage battery comprises an external casing enclosing a group of electrodes. The electrode group includes a nickel positive electrode and a negative electrode containing either cadmium hydroxide or hydrogen absorbing alloys as an active material. The positive electrode and the negative electrode are rolled or layered together with a separator between the two electrodes. The electrode group is impregnated with an alkaline electrolytic solution. A closure cap covers an opening of the external casing. A gasket usually made of nylon, is inserted between the closure cap and the external casing to seal the opening.

When compared with other storage batteries, an alkaline storage battery such as above has excellent charging/discharging characters and can be hermetically sealed so that this alkaline storage battery is used in a variety of appliances.

Improved performance, such as a larger capacity and a longer life, is required for such alkaline storage battery, and their research and development have been conducted to respond to this need.

As batteries are recently used in a wider variety of environments, the alkaline storage battery is also required to endure a wide temperature range from low to high temperatures.

To improve characteristics of the alkaline storage battery at a high temperature, Li is added to an electrolytic solution in one known technique (see Japanese Laid-Open Patent Application No. 11-219721), for instance.

Other techniques to improve the high-temperature characteristic of the alkaline battery are also known as follows:

(a) A solid solution is formed by Co and nickel hydroxide which is a positive electrode active material so as to suppress a decrease in charging efficiency at a high temperature.

(b) Cobalt hydroxide and yttrium hydroxide are added into nickel hydroxide, which is a major constituent of a positive electrode plate. A concentration of Y is 0.5~3%. This provides a high battery capacity and an excellent charging/discharging cycle character (see Japanese Laid-Open Patent Application No. 11-73957).

(c) A surface layer is provided to each particle formed by a crystal of a nickel hydroxide active material. This surface layer contains a solid solution formed by Co, Mn, and other elements like Mg, Ca, and Sr. As a result, high charging efficiency at a high temperature can be provided (see Japanese Laid-Open Patent Application. No. 10-125518).

(d) Al and V are included in a nickel active material. A layer containing Ca, Ti, and the like is formed on the surface of the nickel active material. This provides enhanced charging characteristic at a high temperature (see Japanese Laid-Open Patent Application No. 10-149821).

(e) Nickel hydroxide particles are covered by a layer made of Ni- and Y-base hydroxides so as to provide an enhanced characteristic at a high temperature to an active material (see Japanese Laid-Open Patent Application No. 10-255790).

The above techniques provide alkaline storage batteries with excellent characteristics at room temperatures and high temperatures. However, these alkaline storage batteries do not have a sufficient discharging capacity at a low temperature of around −40° C. In this way, an alkaline storage battery that can be used with stability over a wide temperature range from low to high temperatures have not been achieved yet.

SUMMARY OF THE INVENTION

The present invention therefore aims to provide an alkaline storage battery that can be used with stability over a wide temperature range, To achieve this object, the alkaline storage battery of the present invention includes; a nickel positive electrode containing one or tore types of additive compounds selected from a calcium compound, a strontium compound, a scandium compound, an yttrium compound, and a lanthanoid compound; and an alkaline electrolytic solution having an alkaline concentration of 10 moles/liter (mol/l) or higher.

When the nickel positive electrode includes the above additive compounds, an oxygen overvoltage at a high temperature-increases. This suppresses generation of oxygen gas, and therefore can promote a charging response more than other responses. As a result, charging characteristics at a high temperature enhance.

With a conventional alkaline storage battery, an alkaline concentration of an alkaline electrolytic solution is set as 9 mol/l or lower so as to maintain good operating voltage of the storage battery although a high alkaline concentration of 10 mol/l or higher is set for the present invention. Since an alkaline electrolytic solution with a high alkaline concentration has a low freezing point, the alkaline storage battery of the present invention can operate with stability at a low temperature of around −40° C. and maintain a sufficient discharging capacity. It has been also proved that a sufficient operating voltage can be obtained when the alkaline concentration of the alkaline electrolytic solution is 10 mol/l or higher. In this way, the alkaline storage battery of the present invention has both a sufficient operating voltage and improved discharging characteristics at low temperatures.

A maximum allowable alkaline concentration of the alkaline electrolytic solution should be set within a-range in which an electrolyte compound in the electrolytic solution does not deposit at a low temperature although a very high alkaline concentration may lower an operating voltage of the battery. Accordingly, a suitable alkaline concentration should be set with consideration also given to the operating voltage. The experiments have proved that an alkaline voltage battery-having an alkaline concentration of 10 to 11 mol/l can operate with stability over a wide temperature range from a low temperature to a high temperature.

The alkaline electrolytic solution for the present invention preferably contains one or more types of compounds selected from cesium hydroxide, rubidium hydroxide, potassium hydroxide, and sodium hydroxide as an electrolyte. When lithium-hydroxide, for instance, that has a low water solubility is used for an alkaline electrolytic solution and its concentration is raised, the lithium hydroxide deposits. The above electrolyte compounds for the present invention, however, have a high water solubility, and therefore are not likely to deposit.

When a gasket made of polysulfone is inserted between an external casing and a closure cap of the above alkaline storage battery, a good battery performance can be maintained over a long period as polysulfone has excellent heat resistance.

In addition, as the alkaline storage battery of the present invention includes a separator made of two or more separator means that are layered together, an internal short circuit can be reduced. This is especially advantageous to a nickel-cadmium storage battery, whose negative electrode contains cadmium. When this storage battery is used at a high temperature, a cadmium dendrite grows and an internal short circuit is likely to occur. Accordingly, the above separator made of two or more separator members are suitable for maintaining good long-term performance of the battery.

BRIEF DESCRIPTION OF THE DRAWINGS

These and the other objects and advantages and features of the invention will become apparent from the following description thereof taken in conjunction with the accompanying drawings which illustrate a specific embodiment of the invention, In the drawings.

DESCRIPTION OF THE PREFERRED EMBODIMENTS

Figure 1:
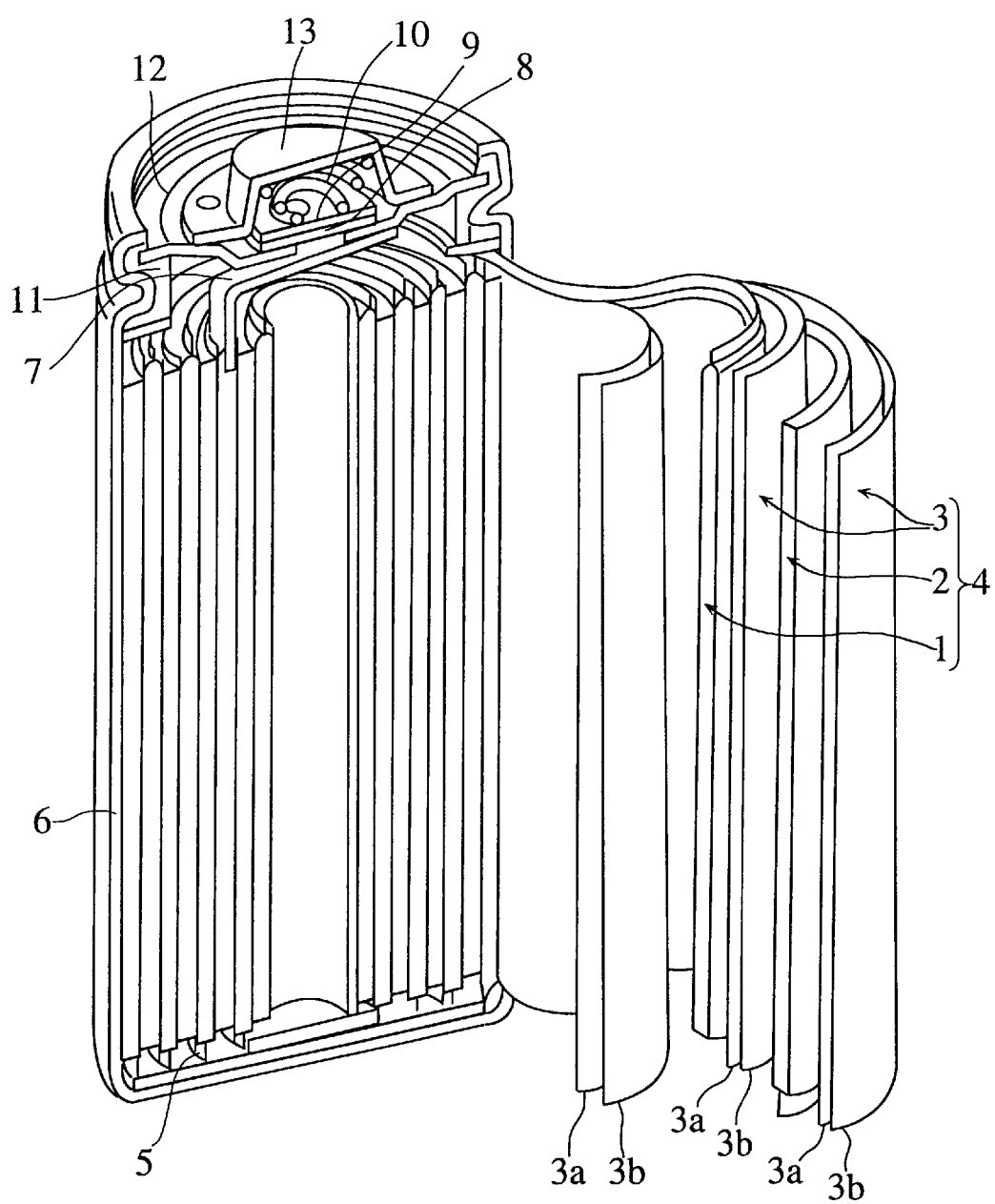
FIG. 1 shows a construction of an alkaline storage battery according to one embodiment of the present

FIG. 1 shows a construction of an alkaline storage battery according to one embodiment of the present invention.

This alkaline storage battery comprises an electrode group 4, an alkaline electrolytic solution (not shown in the figure), and a cylindrical-shaped external casing 6, which encloses the electrode group 4 and the alkaline electrolytic solution. The electrode group 4 includes a sintered nickel positive electrode 1 and a negative electrode 2, which are rolled together with separators 3 being inserted between them. The negative electrode 2 is electrically connected via a negative electrode collector 5 to an internal bottom of the external casing 6.

The external casing 6 has a circular opening on its top, to which a gasket 11 is fitted. A closure cap 12 is attached to this gasket 11, and a positive terminal 13 is attached to the closure cap 12.

In the center of the enclosure cap 12, a valve, which includes a valve plate 8, a retaining plate 9, and a coil spring 10, is formed. This valve is pressed when internal pressure of the alkali storage battery raises so that gas inside the storage battery is released outside.

The positive terminal 13 is electrically connected with the nickel positive electrode 1 by a positive electrode collector 7 and the closure cap 12.

The nickel positive electrode 1 is produced as follows. A sintered nickel base member is filled with a predetermined amount of nickel hydroxide according to a chemical impregnating method so that a nickel hydroxide layer is formed. At least one element compound, out of a Ca compound, an Sr compound, an Sc compound, a Y compound, and a lanthanoid compound, is added to the nickel hydroxide layer. Here, the lanthanoid refers to fifteen rare earth elements with atomic numbers of 57 to 71, which include La, Ce, Fr, NC, Pm, Sm, Eu, Gd, Tb, Dy, Ho, Er, Tm, Yb, and Lu.

The above sintered nickel base member is a porous plate with a porosity of 80 to 85%, and is about 0.5 to 1.0 run thick.

There are three example methods for adding the above element compound to the nickel hydroxide layer. With the first method, a solid-solution is formed by the above element compound with the nickel hydroxide layer. With the second method, the above element compound forms a layer on the surface of the nickel hydroxide layer. With the third method, a nickel hydroxide layer formed as a solid solution with the above element compound is formed on the surface of the nickel hydroxide layer. Of these three methods, the second and third methods are favorable so as to increase an oxygen overvoltage at a high temperature.

A metal mole ratio of the element compound to the nickel hydroxide is in a range of 1% to 10% when the element compound is formed as a solid solution with a nickel hydroxide layer, and is 0.3 to 5% when the element compound is formed as a surface layer on a nickel hydroxide layer.

The nickel positive electrode 1 having the above construction is produced using the following example processes:

(A) Process in which a Y compound is formed as a surface layer on the surface of a nickel hydroxide layer
  Step 1: A sintered nickel base member is immersed into a solution containing nickel nitrate as a major constituent, and alkaline treatment is performed for the nickel base member. These processes are repeated so as to have the nickel base member filled with a predetermined amount of the nickel hydroxide.
  Step 2: The nickel base member filled with the nickel hydroxide is immersed into an yttrium nitrate solution, dried, and then dipped into an alkaline solution.

(B) Process in which a nickel hydroxide layer as a solid solution with a Y compound is formed on the surface of a nickel hydroxide layer
  Step 1: Same as above Step 1
  Step 2: The nickel base member filled with the nickel hydroxide is immersed into a nickel nitrate solution containing yttrium nitrate.

(C) Process in which a Y compound is formed as a solid solution with a nickel hydroxide layer
  Process Step: A sintered nickel base member is immersed into a solution composed of nickel nitrate as a major constituent and yttrium nitrate. Alkaline treatment is performed for this nickel base member. These processes are repeated so as to have the nickel base member filled with nickel hydroxide forming a solid solution with a Y compound.

The negative electrode 2 is achieved by a cadmium negative electrode filled with a predetermine amount of a cadmium active material, such as cadmium hydroxide, according to the chemical impregnating method. It is alternatively possible for the negative electrode 2 to be achieved by a non-sintered cadmium negative electrode and a hydrogen absorbing alloy electrode. The cadmium negative electrode can be produced by repeatedly performing the following processes so as to have cadmium hydroxide generated. A sintered nickel base member is impregnated with nickel nitrate. After this, alkaline treatment is performed for the nickel base member, The separators 3 can be achieved by cutting a commercially available PP separator member to a strip form. The separators 3 are preferably made of two or more separator members cut as a strip form to prevent an internal short circuit from occurring. In the example shown in FIG. 1 the separators 2 are composed of two separator members 3a and 3b that are layered together. This is because, when a nickel-cadmium battery, for instance, is repeatedly charged and discharged, a dendrite of cadmium hydroxide grows in the cadmium negative electrode. Should such dendrite penetrate a separator, an internal short circuit may occur. A cadmium hydroxide dendrite is likely to grow especially when the battery is fused at a high temperature, and so an internal short circuit becomes likely to occur. With the two separator members layered as in the present embodiment, an internal short circuit does not occur until both the first and second layers are penetrated, and therefore an internal short circuit can be suppressed.

Accordingly, the frequency of occurrence of an internal short circuit due to a separator member being penetrated lowers when two separator members with a thickness of 0.2 mm are used than when a single 0.4-mm thick separator member is used.

The gasket 11 may be made of nylon as is conventionally used although polysulfone may be used instead. Polysulfone has high heat resistance, and therefore maintains good sealing performance at a high temperature over a long period. This is advantageous to maintaining a good battery quality at a high temperature over a long period.

An electrolyte of the alkaline electrolytic solution may be preferably achieved by CsOH, RbOH, KOH, or NaOH. Alternatively, it is possible to mix at least two out of the above four types of alkaline electrolytes to generate the alkaline electrolytic solution.

In more detail, out of the above four types of the electrolytes, KOH should be preferably used as a major constituent of the alkaline electrolytic solution because it can provide a relatively high battery capacity over a wide temperature range. It should be noted, however, that each alkaline electrolyte has a unique temperature range in which a high battery capacity can be achieved. Such unique temperature ranges are 0 to 20° C. for KOH, approximately 40° C. for NaOH approximately −40° C. for RbOH, and approximately 0° C. for CsOH. Accordingly a suitable alkaline electrolyte may be selected in accordance with a temperature-range in which the battery is used.

A temperature range that enables a high battery capacity to be realized can be adjusted using two or more types of alkaline electrolytes. For instance, when RbOH is added to KOH to form the alkaline electrolytic solution, battery characteristics at a low temperature is considered to improve more than when only KOH is used as the electrolyte.

The alkaline electrolytic solution for the present embodiment contains a higher alkaline concentration of 10~11 moles/liter (mol/l) than a conventionally-used alkaline concentration of 9 mol/l or lower.

With the conventionally-used alkaline concentration of 9 mol/l or lower, the alkaline electrolytic solution freezes at a low temperature of around −40° C. so that the conventional alkaline storage battery stops operating. With the alkaline concentration of 10 mol/l or higher of the present embodiment, however, the alkaline electrolytic solution does not freeze at such low temperature, and so the battery operates correctly.

It is difficult to generate an alkaline electrolytic solution containing a high alkaline concentration of 10 mol/l or higher by using lithium hydroxide as it has low solubility. CsOH, RbOH, KOH, and NaOH used for the present embodiment, however, have relatively high solubilities, and therefore a high alkaline concentration of 10 mol/l or higher can be easily achieved.

Note that a low alkaline concentration is preferable to obtain a high battery operating voltage at room temperatures. In this sense, the conventional alkaline concentration of 9 mol/l or lower is suitable. It has been verified, however, that the higher alkaline concentration of 10~11 mol/l, for the present embodiment has no substantial negative effect on the battery operating voltage.

A degree of improvement in a discharge characteristic at a low temperature becomes small for an alkaline concentration exceeding 10 mol/l. Rasing an alkaline concentration, however, lowers osmosis of the alkaline electrolytic solution to an electrode group, which means that production efficiency of the process for having the alkaline electrolytic solution permeate into the electrode group decreases. In view of these characteristics, the alkaline concentration should be preferably between 10 mol/l and 11 mol/l inclusive, Experiments Alkaline storage batteries were produced according to the above embodiments ad as to be used for charging/discharging tests described later.

Batteries A1–A4

Based on the above embodiments batteries A1–A4 were produced. The batteries A1–A4 have an SC size and a nominal capacity of 1200 mAh (ampere-hour). Batteries A3 and A4 were produced in accordance with the above-embodiments, and batteries A1 and A2 were produced as examples (hereafter called comparison examples) to be compared with batteries of the present invention.

A nickel positive electrode of the batteries A1–A4 was produced according to the process (A) described above. In Step 2 of the process (A), the sintered nickel base member filled with the nickel hydroxide is dipped for thirty minutes into a 0.5 mol/l yttrium nitrate solution having a pH 5, dried, and then immersed into a 8 mol/l alkaline solution.

Separators of the batteries A1–A4 were made of two 50 g/m$^2$ separator members that-are layered together.

KOH was used as an electrolyte of the alkaline electrolytic solution for the batteries A1–A4. Different alkaline concentrations were used for the batteries A1 to A4 as follows: 8 mol/l for the battery A1; 9 mol/l for the battery A2; 10 mol/l for the battery A3; and 11 mol/l for the battery A4.

Batteries B1~B4

Based on the above embodiments, batteries B1–B4 were produced. The batteries B1–B4 have an SC size and a nominal capacity of 1200 mAh. Batteries B3 and B4 were produced in accordance with the above embodiments, and batteries B1 and B2 were produced as comparison examples.

A nickel positive electrode of the batteries B1–B4 was produced according to the process (B) described above. ID Step 2 of the process (B), the sintered nickel base member filled with nickel hydroxide is immersed, for thirty minutes, into a solution of pH 5 composed of nickel nitrate and yttrium nitrate, which are mixed at a mole ratio of 80:20. A total concentration of the nickel nitrate and yttrium nitrate is 0.5 mol/l. The immersed nickel base member is then dried, and dipped into a 8 mol/l alkaline solution.

Separators of the batteries B1–B4 were made of two 50 gm$^2$ separator members that are layered together.

KOH was used as an electrolyte of the alkaline electrolytic solution for the batteries B1–B4. Different alkaline concentrations were used for the batteries B1 to B4 as follows: 8 mol/1 for the battery B1; 9 mol/l for the battery B2; 10 mol/l for the battery B3; and 11 mol/l for the battery 54.

Batteries C1~C4

Based on the above embodiments, batteries C1–C4 were produced. The batteries C1–C4 have an SC size and a nominal capacity of 1200 mAh. Batteries C3 and C4 were produced in accordance with the above embodiments, and batteries C1 and C2 were produced as comparison examples.

A nickel positive electrode of the batteries C1–C4 was produced according to the process (C) described above. More specifically, the sintered nickel base member filled with the nickel hydroxide was immersed into a solution composed of nickel nitrate and yttrium nitrate, which are mixed at a mole-ratio of 100:1. The immersed nickel base member is then dried, and dipped into an alkaline solution. These processes were repeatedly performed, Separators of the batteries C1–C4 were made of two 50 g/m² separator members that are layered together.

KOH was used as an electrolyte of the alkaline electrolytic solution for the batteries C1–C4. Different alkaline concentrations are used for the alkaline electrolytic solution of the batteries C1 to C4 as follows; 8 mol/l for the battery C1; 9 mol/l for the battery C2; 10 mol/l for the battery C3; and 11 mol/l for the battery C4.

Batteries D1~D4

Batteries D1 to D4 were produced as comparison examples through a process, which is basically the same as used for the batteries A1 to A4 but differs in that Step (2) was not performed for the batteries D1–D4.

The batteries D1 to D4 have basically the same construction as the batteries A1 to A4 except that nickel positive electrodes of the batteries D1 to D4 do not contain yttrium compound.

Battery E

A battery E was produced as a comparison example through a process which is basically the same as used for the batteries D1 to D4 but differs in that it uses, as an alkaline electrolytic solution, an aqueous solution composed of 7 mol/KOH, 1 mol/l NAOH, and 1 mol/l LiOH.

No Y compound was added to a nickel positive electrode of the battery E. The alkaline electrolytic solution contain LiOH and an alkaline concentration of 9 mol/l.

Charging and Discharging Efficiency Tests

A high-temperature charging efficiency test and a low-temperature discharging efficiency test as follows were performed for the above batteries A1 to A4, B1 to B4, C1 to C4, D1 to D4, and E.

High-Temperature Efficiency Test

Each of the above batteries was charged at 25° C. and at 60° C. to obtain discharging capacities for 25° C. and 600° C., respectively. In this test, a ratio of the obtained discharging capacity for 60° C. to the obtained discharging capacity for 25° C. is regarded as the high-temperature charging efficiency.

In more detail the discharging capacity for 25° C. was obtained by charging each battery for 16 hours by using a current of 0.1 C (120 mA) at 25° C., and then discharging the electric charge of the battery with a current of 1 C (120 mA) at 25° C. until a voltage of the battery reaches 0.8V.

The discharging capacity for 60° C. was obtained by charging each battery for 16 hours with a current of 0.1 C at 60° C., and then discharging the electric charge of the battery with a current of 1 C at 25° C. until a voltage of the battery reaches 0.8V.

Low-Temperature Discharging Efficiency Test

Each of the above batteries was charged at 25° C. to obtain discharging capacities for 25° C. and −40° C. In this test, a ratio of the discharging capacity for −40° C. to the discharging capacity for 25° C. is regarded as the low-temperature discharging efficiency.

In more detail, the discharging capacity for 25° C. was obtained by charging each battery for one weeks with a current of 0.1 C at 25° C., and then discharging the electric charge of the battery with a current of 1 C at 25° C.

The discharging capacity for −40° C. was obtained by charging each battery at 25° C. for one weeks with a current of 0.1 C, and then discharging the electric charge of the battery at −40° C. with a current of 1 C.

Figure 2:
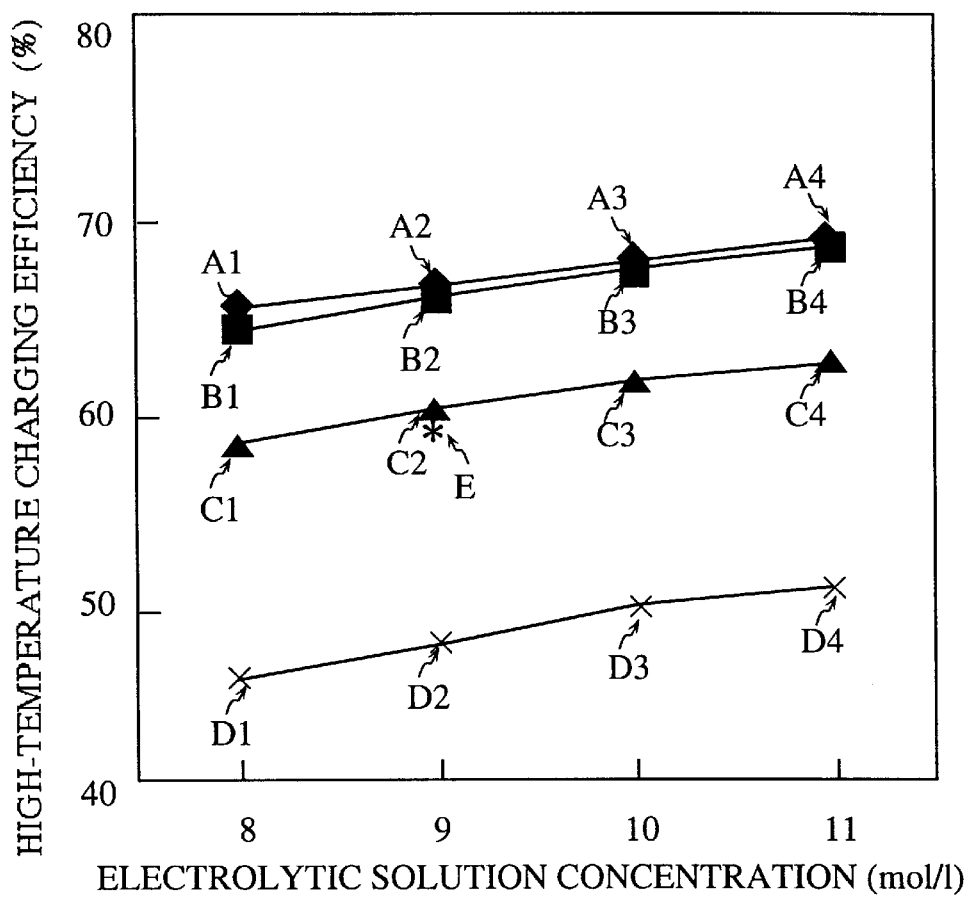
FIG. 2 shows a high-temperature charging efficiency test result.
Figure 3:
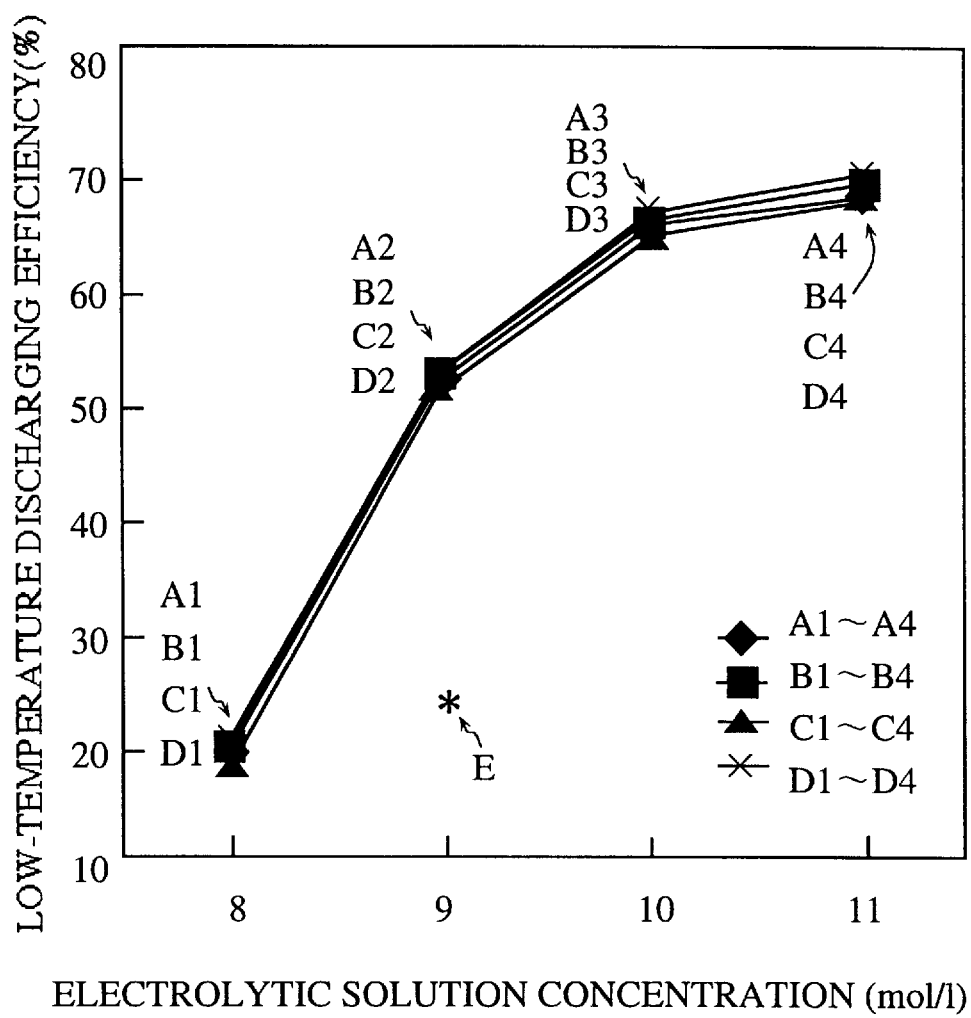
FIG. 3 shows a low-temperature discharging efficiency test result.

FIG. 2 shows the high-temperature charging efficiency test result, or a relationship between an alkaline concentration of an alkaline electrolytic solution and high-temperature charging efficiency. FIG. 3 shows the low-temperature discharging efficiency test result, or a relationship between an alkaline concentration of an alkaline electrolytic solution and low-temperature discharging efficiency is shown.

Analysis of Experiments

It is obvious, from FIG. 2, that the batteries A1–A4, B1–B4, and C1–C4 which include a nickel positive electrode containing the Y compound have higher high-temperature charging efficiency than the batteries D1–D4 and E including nickel positive electrode that does not contain any yttrium compound.

It can be also observed, when characteristics of these batteries A1–A4, B1–B4, and C1–C4 of the high charging efficiency are referred to, that the batteries A1–A4, for which a Y compound layer is formed on the surface of the nickel hydroxide layer, have higher high-temperature charging efficiency than the batteries C1–C4, for which the Y compound forms a solid solution with the nickel hydroxide.

As seen from the figure further, the batteries A2–A4, B2–B4, and C2–C4, which have the nickel positive electrode containing the Y compound and the alkaline electrolytic solution containing the alkaline concentration of 9 mol/l or higher, have higher high-temperature charging efficiency than the battery E, which has the nickel positive electrode containing no yttrium compound, and the alkaline electrolytic solution containing LiOH.

As seen from FIG. 3 with the batteries A1–A4, B1–B4, C1–C4, and D1–D4 including the alkaline electrolytic solution containing KOH, high low-temperature discharging efficiency of 65% or higher is obtained when an alkaline concentration of their alkaline electrolytic solution is 10 mol/l or higher. When the alkaline concentration is 9 mol/l or lower, however, the low-temperature discharging efficiency becomes low. Such low discharging efficiency is considered to be the result of the alkaline electrolytic solution frozen at a low temperature.

It can be also observed, from FIG. 3, that only the battery E has much lower low-temperature discharging efficiency than other batteries A2, B2, C3, and C2 that contain the same alkaline concentration of 9 mol/l as the battery E. This is considered to be caused by a decrease in the alkaline concentration for the battery E. The alkaline concentration becomes low when LiOH contained in the alkaline electrolytic solution of the battery E either; (a) deposits at a low temperature; or (b) is immobilized in initial charging/discharging cycles or during charging at a high temperature. LiOH is immobilized because it forms a solid solution with a positive electrode active material and/or because chemsorption occurs between LiOH and the positive electrode active material.

MODIFICATION EXAMPLES

The above two tests have proved that excellent battery characteristics can be obtained at both high and low temperatures under the following conditions; the Y compound in added to the nickel positive electrode; the alkaline electrolytic solution contains KOH as the electrolyte; and an alkaline concentration of the electrolytic solution is in a range from 10 to 11 mol/l. Different experiments, however, have proved that excellent battery characteristics can be obtained-at both high and low temperatures with the alkaline concentration being in a range from 10 to 11 mol/l when the alkaline electrolyte is not KOH but either: (a) one of NaOH, RbOH, or CsOH; or (b) a mixture containing at least two out of four types of alkaline electrolytes of KOH, NaOH, RbOH, and CsOH.

Similarly, it has been also proved that excellent battery characteristics at high temperatures can be achieved by adding a compound that is not the Y compound to the nickel positive electrode. This is to say, when one compound, out of a Ca compound, an Sr compound, an Sc compound, a Y compound, and a lanthanoid compound, is added to the nickel positive electrode, or when a mixture of some of these compounds is added to the positive electrode, the same effect as obtained through the above embodiments can be expected.

The above embodiments use a cylindrical-shaped alkaline storage battery to describe the present invention. However, the present invention does not limit a shape of a battery, and may be applied to an alkaline storage battery of a rectangular cylindrical shape or of a coin type.

The above embodiment describes the nickel positive electrode as being sintered. The present invention, however can be applied to a non-sintered nickel positive electrode, and the same effect as obtained by the above embodiments can be achieved with such non-sintered nickel positive electrode The non-sintered nickel positive electrode is produced using two methods as follows.

With the first method, one compound, out of a Ca compound, an Sr compound, an Sc compound, a Y compound, and a lanthanoid compound, is selected, or some of these compounds are selected to form a mixture. Positive electrode active material particles are formed by having the above selected compound or mixture form a solid solution with nickel hydroxide, The formed active material particles are then filled into a positive electrode base member, which is a nickel foaming member, so that the nickel positive electrode can be produced.

With the second method, a layer made of the above select-ed compound or the above mixture is formed on a surface of each active material particle containing nickel hydroxide as a major constituent. These active material particles are filled into a positive electrode base member, so that the nickel positive electrode is produced.

Although the present invention has been fully described by way of examples with reference to accompanying drawings, it is to be noted that various changes and modifications will be apparent to those skilled in the art, therefore unless such changes and modifications depart from the scope of the present invention, they should be construed as being included therein.

What is claimed is:

1. An alkaline storage battery, comprising an electrode element and an alkaline electrolytic solution that are enclosed in a battery casing, the electrode element including a nickel positive electrode and a negative electrode with a separator being inserted there between, the nickel positive electrode and the negative electrode being either rolled together or layered, wherein the nickel positive electrode contains one or more additive compounds selected from a calcium compound, a strontium compound, a scandium compound, an yttrium compound, and a lanthanoid compound, wherein the alkaline electrolytic solution has an alkaline concentration of 10 moles/liter or higher, and does not contain lithium hydroxide.

2. The alkaline storage battery of claim 1, wherein the battery casing includes:

an external casing that has an opening;

a closure cap that covers the opening and a gasket that is made of polysulfone and inserted between the external casing and the closure cap.

3. The alkaline storage battery of claim 1, wherein the alkaline electrolytic solution consists of one or more electrolyte compounds selected from cesium hydroxide, rubidium hydroxide, potassium hydroxide, and sodium hydroxide as an electrolyte.

4. The alkaline storage battery of claim 3, wherein the battery casing includes:

an external casing that has an opening;

a closure cap that covers the opening; and a gasket that is made of polysulfone and inserted between the external casing and the closure cap.

5. The alkaline storage battery of claim 1, wherein the nickel positive electrode includes a a base member on which an active material layer made of a solid solution is formed, the solid solution being formed by the additive compounds and nickel hydroxide.

6. The alkaline storage battery of claim 5, wherein a metal mole ratio of the additive compounds to the nickel hydroxide is in a range of 1% to 10% inclusive.

7. The alkaline storage battery of claim 5, wherein the alkaline electrolytic solution consists of one or more electrolyte compounds selected from cesium hydroxide, rubidium hydroxide, potassium hydroxide, and sodium hydroxide as an electrolyte.

8. The alkaline storage battery of claim 1, wherein the nickel positive electrode includes a base member on which an active material layer made of nickel hydroxide is formed, and wherein on the active material layer, a layer made of the additive compounds is formed.

9. The alkaline storage battery of claim 8, wherein a metal mole ratio of the additive compounds to the nickel hydroxide is in a range of 0.3% to 5% inclusive.

10. The alkaline storage battery of claim 8, wherein the alkaline electrolytic solution consists of one or more electrolyte compounds selected from cesium hydroxide, rubidium hydroxide, potassium hydroxide, and sodium hydroxide as an electrolyte.

11. The alkaline storage battery of claim 1, wherein the separator includes two or more separator members that are layered.

* * * * *